INVENTOR.
Robert T. Casey

United States Patent Office 3,425,007
Patented Jan. 28, 1969

3,425,007
ELECTRIC CIRCUIT BREAKER INCLUDING SENSING MEANS OPERATED BY THE OPERATING HANDLE
Robert T. Casey, Southington, Conn., assignor to General Electric Company, a corporation of New York
Filed May 26, 1967, Ser. No. 641,660
U.S. Cl. 335—11         9 Claims
Int. Cl. H01h 77/04

ABSTRACT OF THE DISCLOSURE

An electric circuit breaker including separable contacts which are manually as well as automatically operable includes sensing means operated upon initial movement of the operating handle, which senses the impedance conditions of the load circuit in which the circuit breaker is connected, and which prevents closing of the circuit breaker if the impedance in the load circuit is below a predetermined desired level.

BACKGROUND OF THE INVENTION

Field of the invention

My invention relates to electric circuit breakers, and more particularly to electric circuit breakers of the type including circuit making and breaking means which is manually as well as automatically operable, the circuit making and breaking means, as well as the manual and automatic operating mechanism, usually being enclosed in a single enclosing casing of insulating material, with a manually operable handle projecting therefrom.

Description of the prior art

Circuit breakers of the type referred to are commonly used as circuit protective devices, and also to serve as switching devices for manually opening and closing the protected circuit. In accordance with its function as a circuit protective device, the circuit breaker causes the contacts to automatically move from closed to open position whenever certain predetermined abnormal conditions exist in the circuit. Most commonly, the abnormal conditions referred to consist of unusually high current conditions such as would, if permitted to continue, cause overheating of the conductors in the circuit and destruction of insulation or failure of the circuits in some other respect. A moderately high overcurrent condition persisting for a relatively long time could cause such damage to the circuit conductors and accordingly causes automatic opening of the device. In addition, an extremely high overcurrent condition existing for a relatively short time also causes automatic opening of the circuit breaker. In addition to this "inverse time-current" protecting function, such circuit breakers also include means for rapidly opening the contacts and extinguishing the arc drawn in the process thereof upon the occurrence of a short circuit condition in the protected circuit.

Short circuit interruptions involve the rapid dissipation of high amounts of energy by the circuit breaker, and quite commonly are accompanied by the generation of a substantial amount of hot arc gases, which are dissipated through suitable vents in the circuit breaker enclosing casing. The venting and handle sealing provisions of the circuit breaker casing are therefore constructed so as to minimize the likelihood of such hot arc gases being emitted in a location or direction such as to cause burns to the hand or person of an operator who may have just moved the circuit breaker handle to closed circuit position. For this purpose, for example, electrical safety code authorities require that such circuit breakers successfully pass a test in which cotton is placed around the operating handle of the circuit breaker and it is subjected to a short circuit test. The current must be interrupted and the cotton must not be ignited by any such hot gases.

Summary of the invention

It is an object of the present invention to provide an electric circuit breaker of the type described which has an increased margin of safety for preventing possible damage or injury to an operator who may happen to close a circuit breaker on a circuit in which a short circuit exists. Such a condition, may for example occur, in an initial installation of electric wiring which may be incorrectly connected, causing the existence of a "dead short circuit" on the load side of the circuit breaker. Such a condition may not be suspected to exist until the circuit breaker is closed, at which time a high short circuit current will flow, requiring a short circuit interruption of the type described.

It is another object of the invention to provide an electric circuit breaker including means for preventing manual closing of the circuit breaker on a short circuit, which can readily be utilized with electric circuit breakers of conventional construction.

It is another object of the invention to provide an electric circuit breaker of the type described which is relatively low cost and utilizing conventional components.

In accordance with the invention, an electric circuit breaker is provided which is generally of conventional construction including a pair of separable contacts and manually and automatically operable means for moving the contacts between open and closed circuit position. The operating mechanism includes a member which is movable to cause tripping or automatic opening of the circuit breaker mechanism. The circuit breaker further includes a pre-sensing device comprising an electric solenoid and a miniature switch which is normally retained in the open circuit position, but which is closed for a short time during the initial portion of the closing movement of the manually operable handle of the circuit breaker. This initial movement of the manual operating handle of the breaker connects the pre-sensing solenoid in circuit with the load to which the circuit breaker is connected before the main contacts of the circuit breaker can close. If the impedance conditions of the load circuit are such that they would cause an excessively high current to flow if the circuit breaker were closed, the pre-sensing solenoid causes tripping of the circuit breaker operating mechanism, making it impossible to close the contacts by means of the manually operable handle. The conventional trip indicating means of the circuit breaker then indicates to the operator that something is wrong in the load circuit, giving him an opportunity to check this and correct it before the main power circuit is closed.

The invention will be more fully understood from the following detailed description, and its scope will be pointed out in the appended claims.

DESCRIPTION OF THE DRAWING

In the drawing,

Referring to FIGURE 1, the invention is shown as incorporated in an electric circuit breaker comprising an enclosing casing of insulating material including a base 10 and a cover 11. A load terminal 12 is supported on the insulating base 10 at one end thereof, and is electrically connected by means of a flexible conductor or braid 13 to an elongated upstanding bimetallic strip 14 which is fixedly mounted at one end 14A in the base 10 by suitable means, not shown, and has its opposite end 14B movable and carrying a calibrating screw 15, for a purpose to be described.

Figure 1:
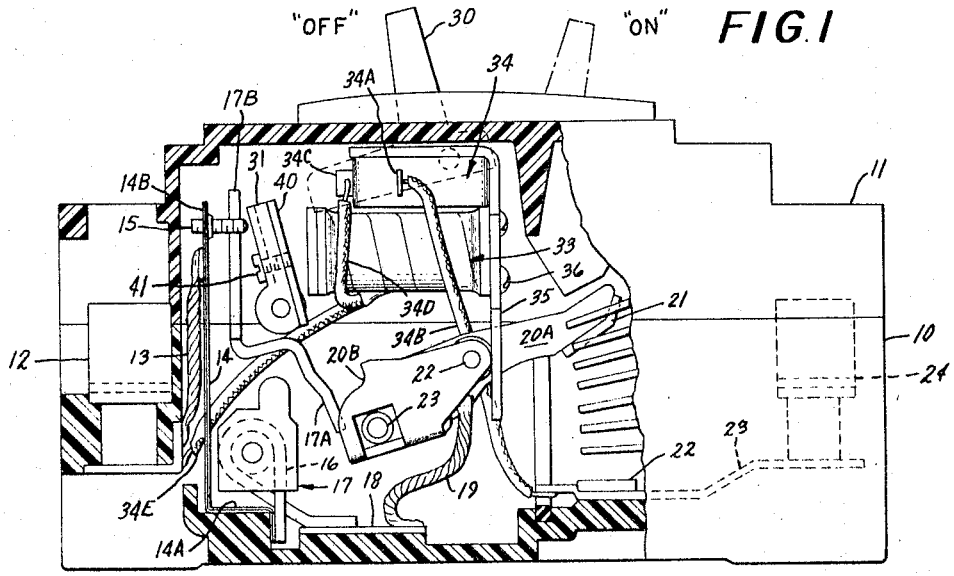
FIGURE 1 is a side elevation view of an electric circuit breaker incorporating the invention portions of the side of the casing thereof being broken away to show the internal parts.

The end 14A of the bimetallic strip 14 is connected to a winding 16 of a short circuit trip device 17. The opposite end of the winding 16 is connected by means of a rigid conductor 18 and a flexible conductor 19 to the movable portion 20A of a contact arm assembly. The contact arm portion 20A carries a movable contact member 21 at one end and is pivotally connected by means of a pivot pin 22 to the contact arm portion 20B which is rigidly affixed to a contact cross-arm square cross-section shaft 23.

The movable contact member 21 is arranged to engage a stationary contact member 22 which is supported on a terminal strap member 23 leading to an input or line terminal member 24 also supported on the insulating base 10.

The main current path through the circuit breaker therefore is as follows: from the line terminal 24, through the terminal strap 23 to stationary contact 22, to movable contact 21, to contact arm portion 20A, to flexible conductor 19, to conductor strap 18, to solenoid winding 16, to bimetallic strip 14, and finally through flexible conductor 13 to load terminal 12.

The contact arm 20B is moved between open and closed circuit positions by means of a tripable or releasable manual operating mechanism, not shown, which may be of conventional structure, such, for example, as shown in Patent 3,005,066 D. B. Powell, issued Oct. 17, 1961 and assigned to the same assignee as the present invention, and in Patent 3,046,371 Jencks et al., issued July 24, 1962 and assigned to the same assignee as the present invention.

The operating mechanism includes a manually operable handle member 30 which is supported for reciprocating movement along an arcuate path between "off" and "on" positions as shown in FIGURE 1 to move the contact member 21 between open and closed circuit positions. The circuit breaker operating mechanism, as described in the aforesaid patents, includes a trip member or trip bar 31, which when rotated a predetermined amount in clockwise direction as viewed in FIGURE 1, causes automatic opening of the contacts, regardless of whether the manually operable handle member 30 is forcibly retained in the "on" position or not. Thus, in accordance with operation of the aforesaid conventional operating mechanism, a predetermined excess current through the circuit in which the circuit breaker is connected causes heating of the bimetallic strip 14, which is arranged to deflect so as to move the calibrating screw 15 into engagement with the trip bar 31, causing rotation of the trip bar 31 and tripping of the circuit breaker mechanism. Likewise, upon the occurrence of a relatively higher value of overcurrent for a relatively shorter time, the solenoid 17 is energized and attracts the armature 17A, the upper end 17B of which is moved in clockwise direction, engaging the trip bar 31 and causing tripping of the circuit breaker mechanism, all generally as described in the aforementioned patent.

It will be observed that in accordance with the structure described thus far, it is possible to move the operating handle member from "off" to "on" position at any time, causing the movable contact 21 to be moved into engagement with the stationary contact 22. If, following such closing, the current which ensues is of a predetermined undesirable magnitude, the circuit breaker will trip, as previously described. No such tripping, can occur, however, until the contacts 21 and 22 close.

Figure 2:
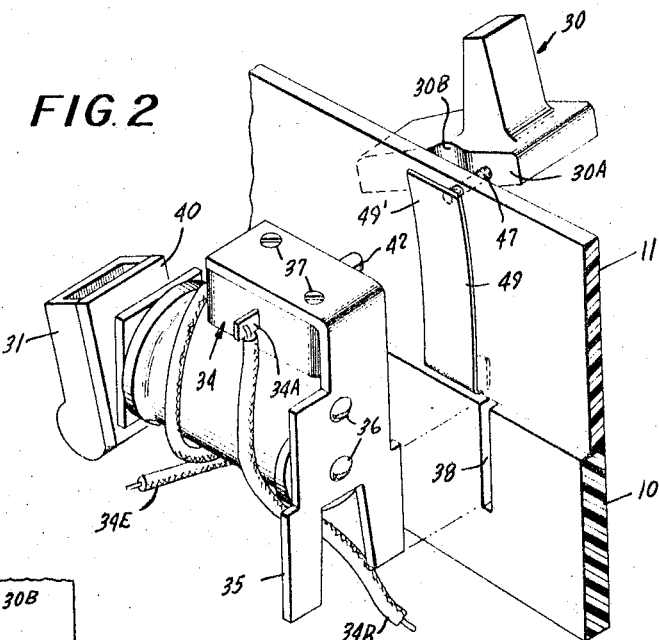
FIGURE 2 is an exploded perspective view of a portion of the circuit breaker of FIGURE 1.

In accordance with the present invention, a further current sensing or "pre-sensing" device is provided, comprising solenoid 33 and control switch 34, both of which are supported on a generally L-shaped support bracket 35, see FIGURE 2, the solenoid 33 being anchored to the frame 35 by means of screws 36, and the switch means 34 being anchored to the frame by means of screws 37. The frame 35 is supported on the base 10 by any suitable means, such, for example, as by having a portion thereof received in a slot 38 in a side wall portion of the base 10, as indicated in FIGURE 2. An armature 40 is also provided, which is fixedly attached to the trip bar 31 by suitable means such for example as by means of screw 41, see FIGURE 1. The control switch 34 includes a plunger type actuator 42, and bridging contacts 43, see FIGURE 3, which are biased toward closed circuit position by means of spring 44, toward engagement with stationary contacts 45.

The control switch 34 is normally retained in open circuit position by means of a plunger 47, see FIGURE 2, which is slidably supported in a hole 48 in the side wall portion of the circuit breaker cover 11 and which engages the movable end 49' of an elongated flexible spring strip 49, having its other end rigidly mounted in the casing 10.

Figure 3:
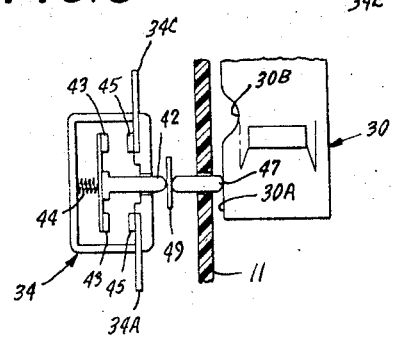
FIGURE 3 is a fragmentary plan view partially in section of a portion of the circuit breaker of FIGURE 1.

The end 49' of the strip 49 engages the plunger 42 of the switching device 34, as shown in FIGURE 3. One end portion of the plunger 47 rides against a side surface 30A of the operating handle 30 and normally retains the switching device 34 in open circuit position as previously described. The handle member 30 also includes a recess or notch 30B in the side wall portion 30A, into which the plunger 47 moves when the manual operating handle is moved from "off" position toward "on" position, thus permitting the contacts of the switching device 34 to close temporarily or in transient fashion, the contacts being thereafter immediately reopened as the end of the plunger 47 rides on the side surface 30A of the handle and is cammed out of the recess 30B.

The control switch 34 has one terminal 34A thereof connected to a conductor 34B which in turn is connected to the terminal strap 23 adjacent the line terminal 24 of the circuit breaker. The other terminal 34C of the control switch 34 is connected by means of a conductor 34D to the solenoid 33, the other terminal of the solenoid 33 being connected by means of a conductor 34E to the load terminal 12 of the circuit breaker.

Figure 4:
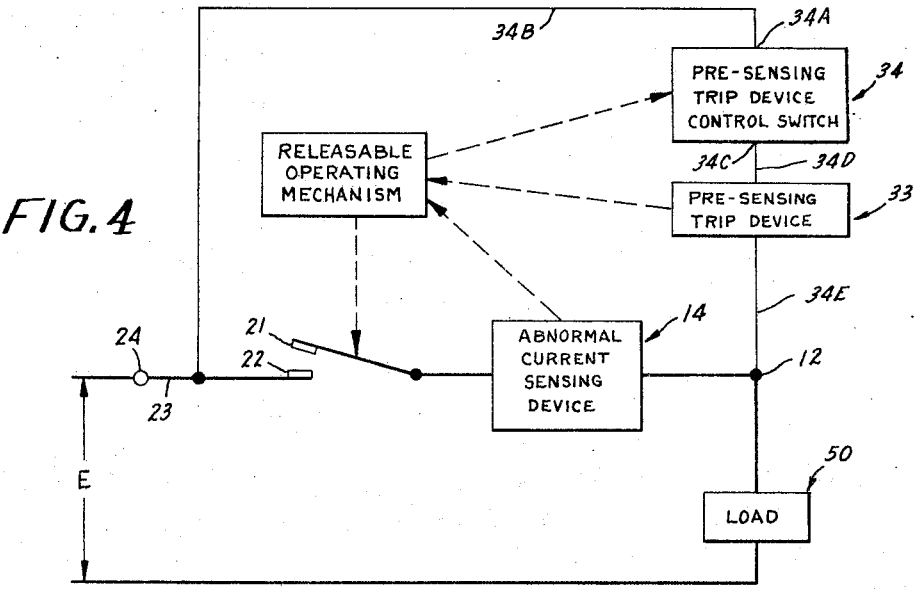
FIGURE 4 is a schematic block-type diagram of the components of the circuit breaker of FIGURE 1.

The connections of the pre-sensing trip device 33 and its control switch 34 are, therefore, as shown in block diagram form in FIGURE 4, in which these components are shown as connected in series, and this series combination connected in parallel across the circuit breaker contacts. In the block diagram of FIGURE 4, the electrical connections are shown by solid lines, and the mechanical control relationships of the components are indicated by dotted lines, the arrow direction being from the controlling to the controlled component.

OPERATION OF THE INVENTION

In operation, it will be observed that as soon as the operating handle 30 is moved a short distance from "off" position toward "on" position, the plunger 47 drops into the recess 30B closing the switching device 34, connecting the pre-sensing trip device solenoid 33 electrically in series with the load 50.

The impedance of the solenoid 33 is chosen so that if the load 50 has an impedance greater than a predetermined amount, the value of current flowing through the circuit at this time, that is, flowing through the solenoid 33 and the load 50, will be *insufficient* to attract the armature 40. The aforesaid predetermined level of impedance of the load 50 will ordinarily be any level sufficiently high to indicate that current flowing therethrough under normal circuit conditions, that is, with the circuit breaker main contacts 21, 22 closed, can be readily interrupted by the circuit breaker without excessive hot gases, etc. This ordinarily will mean that there is no short circuit condition existing in the load 50.

If, however, due to faulty installation or some other reason, a short circuit condition actually exists in the load 50 such that a high short circuit current would flow if the main contacts 21, 22 were closed, then the current flowing through the solenoid 33 when the control switch 34 is closed, will be sufficient to attract the armature 40, rotating the trip bar 31, and tripping the circuit breaker mechanism, and rendering it impossible to close the contacts 21, 22 by means of the handle 30.

For most applications, it will be found that a solenoid rated for use on a circuit of the voltage rating in which the circuit breaker is being utilized will be suitable for use.

The action of the solenoid 33 is extremely rapid, and it has been found in actual test that it is physically impossible to move the operating handle 30 of a conventional circuit breaker from "off" to "on" position fast enough to close the contacts 21 and 22 when a short circuit condition exists. Each time this is attempted, the mechanism is tripped by the action of the solenoid and prevents significant movement of the contact arm. Accordingly, with the invention there is no possibility of an operator closing the electric circuit breaker of the invention on to a short circuit and having the short circuit interruption take place while his hand is on the circuit breaker.

It is also contemplated by the invention, that the structure described may also be utilized with "non-automatic" circuit breakers, that is, circuit breakers which do not contain a current-sensing means such as bimetallic strip 14 or magnetic trip means 17, but which do contain releasable means which when released in effect breaks the operative relation between the manually operable handle and the movable contact member.

Figure 5:
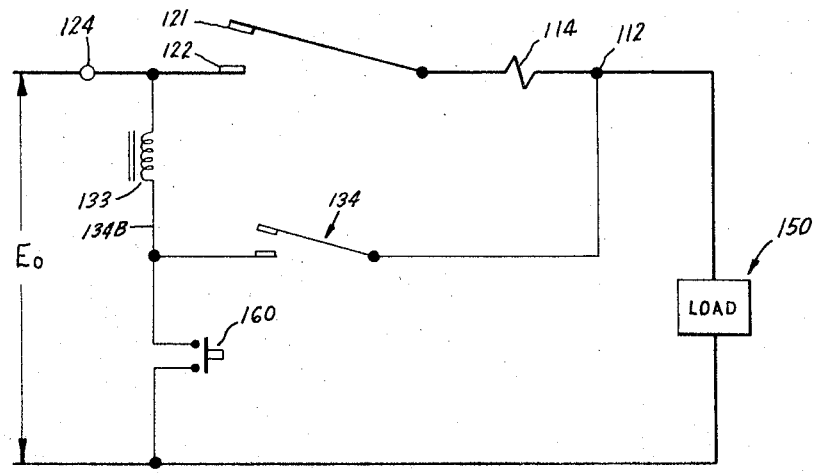
FIGURE 5 is a schematic representation of another form of the invention.

In accordance with the invention in the form illustrated in FIGURE 5, I provide for the use of the solenoid 133 as a "remote trip" solenoid, in addition to its function as a "pre-sensing trip device." In this form, a remotely-located push-button switch 160 is provided, which is connected between the solenoid 133 and the ground side of the system.

The circuit of FIGURE 5 functions in the same manner as that of FIGURES 1–4 in that initial movement of the operating mechanism (not shown) for the contacts 121, 122, closes the control switch 134 before the contacts 121, 122. If an abnormally low impedance exists in the load circuit, the solenoid 133 will be actuated, tripping the mechanism and preventing closing of the contacts 121, 122. If the impedance of the load circuit is within the desired range, however, the solenoid 133 is not actuated, and further movement of the operating mechanism reopens switch 134 and closes the main contacts 121, 122.

If it is desired to open the contacts 121, 122 from a remote location, the push-button switch 160 is closed, energizing the solenoid 133 and tripping the operating mechanism.

Figure 6:
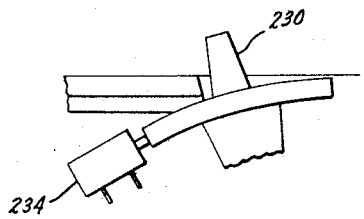
FIGURE 6 is a fragmentary elevation view partly in section of another form of the invention.

In a third form of the invention, the control switch is not re-opened by the handle 230 as it completes its movement toward "on" position. Thus, as shown in FIGURE 6, the switch 234 in this form is simply retained in open condition by the operating handle 230 so long as the operating handle is in the "open" position. Any movement of the handle away from "off" position closes switch 234, connecting the pre-sensing trip device in series with the load across the power source.

When the main contacts are closed (assuming that no abnormal condition exists in the load circuit) they short out or by-pass the pre-sensing trip device as may be seen from FIGURE 4. The switch 234 may therefore be left closed without damage to the pre-sensing trip device.

The advantage of this form is that it permits a very simple arrangement and does not require any significant modification of a standard circuit breaker in order to add the safety feature of the invention.

While the invention has been illustrated in only three specific embodiments, it will be readily apparent that many modifications thereof can readily be made. It is contemplated, for example, that the "pre-sensing" device may comprise a voltage-sensitive device rather than a current sensing device in some instances. It is contemplated also that the main contacts, rather than operating in open air, may be totally enclosed. In this case, although there would not be ordinarily the danger of hot gases being emitted during the short circuit interruption, nevertheless there is always an element of danger if failure to interrupt. In addition, the invention may be beneficially used with such devices or even with non-contact operating devices if a movable operating member is used, for the purpose of anticipating the existence of a short circuit condition and making possible the correction or removal of the short circuit, prior to energizing the main circuit, thereby saving the itnerrupting device from the task of having to perform a short circuit interruption, and saving wear, thereby prolonging the life of the device.

In accordance with the foregoing, it is therefore intended by the appended claims to cover all such modifications as fall within the true spirit and scope of the invention.

What I claim as new and desire to secure by Letters Patent of the United States is:

1. An electric circuit interruptor comprising:
 (a) switching means for making and breaking an electric circuit;
 (b) mechancally operable means for operating said switching means between open circuit and closed circuit positions;
 (c) releasable means, said releasable means, when released preventing operation of said switching means by said mechanically operable means;
 (d) electrical sensing means for actuating said releasable means upon the occurrence of predetermined conditions;
 (e) means for connecting said electrical sensing means electrically in parallel with said switching means;
 (f) said means for connecting said electrical sensing means in parallel with said switching means including a control switch, and
 (g) means connecting said mechanically operable means to said control switch for closing said control switch by said mechanically operable means prior to operation of said switching means to said closed circuit position by said mechanically operable means.

2. An electric circuit interrupter as set forth in claim 1 wherein said releasable means comprises part of said mechanically operable means.

3. An electric circuit interrupter as set forth in claim 1 wherein said means connecting said mechanically operable means to said control switch includes means for reopening said control switch also prior operation of said switching means to said closed circuit position by said mechanically operable means.

4. An electric circuit interrupter comprising:
 (a) switching means for making and breaking an electric circuit;
 (b) manually operable means for operating said switching means between said open and closed circuit positions;
 (c) releasable means, said releasable means when re-released preventing operation of said switching means by said manually operable means;
 (d) first electro-responsive means connected electrically in series with said switching means for causing release of said releasable means upon the occurrence of predetermined electric conditions in said circuit;
 (e) second electro-responsive means;
 (f) means for connecting said second electro-responsive means electrically in parallel with said switching means;

(g) said means for connecting said second electro-responsive means in parallel with said switching means including a control switch, and (h) operating means operated by said manually operable means for closing said control switch to connect said second electro-responsive means in parallel with said switching means prior to operation of said switching means to said closed circuit position by said manually operable means.

5. An electric circuit interrupter as set forth in claim 4 wherein said switching means comprises at least one pair of separable contacts.

6. An electric circuit interrupter as set forth in claim 4 wherein said circuit interrupter has a predetermined normal voltage and current rating, and wherein said second electro-responsive means is operable at said normal voltage only when the impedance connected electrically in series therewith is less than the lowest value of impedance which permits current within the rated range of said circuit interrupter to pass therethrough.

7. An electric circuit interrupter comprising:
(a) a support;
(b) at least one pair of separable contacts supported on said support;
(c) operating mechanism supported on said support for operating said separable contacts between open and closed circuit positions, said operating mechanism including manually operable means for moving said contacts between said open and closed circuit positions and a trip member movable to cause automatic movement of said contacts from said closed to said open circuit position;
(d) said manually operable means also including a manually operable handle member;
(e) first electrically operable trip means supported on said support for causing movement of said trip member of said operating mechanism upon the occurrence of predetermined abnormal electrical conditions in said circuit;
(f) second electrically operable trip means supported on said support for causing movement of said trip member of said operating mechanism;
(g) control switch means connected electrically in series with said second trip means;
(h) said manually operable handle member being movable between open and closed circuit positions respectively;
(i) means actuated by said manually operable handle member upon movement thereof away from said open circuit position to cause closing of said control switch means prior to movement of said separable contacts from said open to said closed circuit position by said handle member.

8. An electric circuit interrupter as set forth in claim 7 wherein said control switch means includes an insulating actuating member and said manually operable means includes a cam surface engaging said insulating operating member of said control switch means.

9. An electric circuit interrupter as set forth in claim 7, wherein said circuit interrupter also includes means electrically connecting said second trip means and said control switch means electrically in parallel with said separable contacts.

References Cited

UNITED STATES PATENTS

| | | | |
|---|---|---|---|
| 2,100,757 | 11/1937 | Swingle | 317—23 |
| 2,620,382 | 12/1952 | Van Ryan | 317—23 |
| 3,201,650 | 8/1965 | Schultz | 317—23 |

BERNARD A. GILHEANY, *Primary Examiner.*

HAROLD BROOME, *Assistant Examiner.*

U.S. Cl. X.R.

317—23; 200—116